United States Patent Office 2,714,071
Patented July 26, 1955

2,714,071

SOLVENT FOR RECLAIMING VULCANIZED RUBBER

Edward A. Van Valkenburgh, Greene, N. Y.

No Drawing. Application August 14, 1951,
Serial No. 241,890

3 Claims. (Cl. 106—123)

This invention relates to an oil composition having special advantages for use in the alkali and acid processes of reclaiming vulcanized rubber.

The new compositions are made up mainly of a liquid hydrocarbon oil containing a substantial amount of aromatic petroleum naphtha and a small amount of an amine soap of heat treated crude tall oil in the proportions of about 5% to 15% of amine soap and 85% to 95% of hydrocarbon oil.

In the reclaiming of vulcanized rubber scrap, the scrap is digested under pressure for a considerable period of time with caustic alkali, in the alkali reclaiming process, and with zinc chloride or calcium chloride, in the acid reclaiming process. Difficulties are encountered in obtaining a reclaimed scrap having the desired properties. The new oil composition of the present invention is particularly advantageous for use as an addition in such reclaiming processes for reclaiming vulcanized rubber scrap and particularly synthetic rubber scrap such as GR–S tread stock for the production of reclaimed rubber therefrom.

The amine soaps used in small amount in the new compositions are made from heat treated tall oil and a non-volatile aliphatic amine and particularly a polyalkylene polyamine such as diethylene triamine, triethylene tetramine, or tetraethylene pentamine, etc.

Crude tall oil is produced as a byproduct from the paper pulp industry and is made up largely of resin acids and fatty acids, e. g., around 50% of resin acids, 40% of fatty acids, and around 10% of unsaponifiable material such as sterols and high molecular weight aliphatic alcohol. Crude tall oil forms a semi-solid, non-homogeneous mass on standing and may separate into an upper liquid and lower solid or semi-solid layer.

In order to overcome such lack of homogeneity, the crude tall oil is subjected to a heat treatment, for example by heating with continuous mechanical agitation at a temperature of around 350° F. for a period of about one hour. Somewhat lower or higher temperatures can be used, e. g., of around 260° to around 400° F., for periods of time of from around one and one-half hours to one-half hour, the time and temperature being sufficient to ensure a homogeneous liquid heat treated product.

The amines used for converting the tall oil acids into amine soaps are aliphatic amines, and particularly aliphatic polyamines such as polyalkylene polyamines, and advantageously amines which are relatively non-volatile, such as the polyethylene polyamines such as diethylene triamine, triethylene tetramine, tetraethylene pentamine, etc. The amount of amine used is sufficient to effect neutralization of the tall oil acids and convert them into tall oil acid soaps.

The tall oil amine soaps can be readily made by adding the amine gradually to the hot heat treated tall oil acids by introducing them below the surface with continuous stirring until the soaps are formed. Polyethylene polyamines have two terminal primary amine groups and one or more intermediate secondary imine groups. The primary amine groups appear to react more readily, and the amount of polyamine may be such that some of the intermediate imine groups are not reacted.

The liquid hydrocarbon oil may also advantageously be blended in part or in whole with the hot heat treated tall oil prior to the addition of the amines and the formation of the amine soaps.

The hydrocarbon oils used are oils containing a considerable amount of aromatic constituents such as aromatic petroleum naphthas. The hydrocarbon oil may be made up entirely of such aromatic naphthas or a substantial part of such aromatic naphthas admixed with non-volatile hydrocarbon oils. Such oils can advantageously be blended with the hot heat treated tall oil by adding the hydrocarbon oil, at ordinary temperatures, to the hot heat treated tall oil beneath the surface and with continued stirring to form a homogeneous blend of the heat treated tall oil and added hydrocarbon oil, before the amines are added and the amine soaps formed; or the petroleum oils can be added in part to the hot heat treated tall oil prior to the formation of the soaps and in part after the formation of such soaps.

An advantageous composition for use in the reclaiming of vulcanized scrap is made by combining tall oil with diethylene triamine to form the amine soap and blending this with aromatic petroleum naphtha such as the product known in the trade as "Esso 180 Naphtha" in the proportions of about 90 parts of "180 Naphtha" and 11 parts of the diethylene triamine soap of tall oil acids made by reacting 10 parts by weight of tall oil acids with about 1 part by weight of diethylene triamine to form a composition containing about 90 parts of aromatic naphtha and 11 parts of the tall oil amine soap.

Aromatic naphthas are obtained in the catalytic cracking and hydro-forming processes and are high in aromatic constituents and usually also contain considerable naphthenic constituents. The product known as "Esso Aromatic Naphtha 180" thus typically has an API gravity of about 21.8, a weight of about 7.69 pounds per gallon, a flash point (Pensky) of about 196° F., a pour point below 0° F., an ASTM distillation with an initial boiling point of about 404° F. with 10% distilling up to 480° F., 50% to 508° F., 90% to 548° F., and a final boiling point of 584° F.; and containing about 65% aromatics and having a mixed aniline point of about 41.6° C.

Other aromatic petroleum naphthas produced by the catalytic process or hydro-forming process and fractionating from the resulting product vary somewhat in their aromatic content.

The aromatic naphtha can be replaced in part by non-volatile hydrocarbon oils such as those sold under the trade names "Lopor 42" and "WS–945 Process Oil." The "Lopor 42" is a fraction from a naphthalene base oil having typically a specific gravity at 60° F. of about .908, a weight at 60° F. of about 7.56 pounds per gallon, a flash point of about 360° F., a viscosity at 100° F. of about 154 and at 210° F. of about 42, a pour point of about −20° F., and an aniline point of about 170° F.

The "WS–945 Process Oil" is an aromatic extract from naphthene base cylinder stock lubricating oils when extracted with phenol, and typically has a specific gravity at 60° F. of about .982, weighs about 8.18 pounds per gallon at 60° F., has a flash point of about 425° F., a viscosity at 100° F. of 9800 and at 210° F. of 125, a pour point of above 40 F., and an aniline point of about 108° F.

Such hydrocarbon oils are non-volatile at the ordinary temperature of vulcanization and can replace to a considerable extent, e. g. up to one-half or somewhat more, the aromatic naphtha. But the use of the aromatic petroleum naphtha with such non-volatile oils has the advantage of promoting homogeneity and improving penetration of the rubber during reclaiming.

The new composition is particularly advantageous for use in the alkali reclaiming of rubber with caustic alkali and also in the acid reclaiming process, in which the rubber is digested with a small amount of zinc chloride or calcium chloride under pressure for a considerable period of time. The amine soap appears to have an important and desirable effect on the reactions taking place during the acid or alkali reclaiming process, and the hydrocarbon oils, together with the amine soaps, give an improved reclaimed rubber with a desirable plasticity and without objectionable tackiness. The petroleum naphtha may be removed by vulcanization to some extent from the reclaimed rubber, particularly on prolonged standing. The non-volatile petroleum oils, when present, remain largely or completely in the reclaimed rubber, while the amine tall oil soaps or their reaction products also contribute desirable properties to the reclaimed rubber.

In using the new composition in the alkali reclaiming process, e. g., with caustic soda, or in the acid reclaiming process, e. g. with a small amount of calcium chloride, the oil composition is added to the digester charge using e. g. 125 gallons of the composition or about 1000 pounds for a 10,000 pound batch of whole tire scrap.

I claim:

1. An oil composition for use in the reclaiming of vulcanized rubber scrap, said composition consisting for the most part of petroleum hydrocarbon oil having a substantial proportion of aromatic petroleum naphtha and from 5% to 15% by weight of polyalkylene polyamine soaps of tall oil acids selected from the group which consists of diethylene triamine, triethylene tetramine, and tetraethylene pentamine.

2. A composition as defined in claim 1, in which the hydrocarbon oil is made up essentially of aromatic petroleum naphtha.

3. A composition as defined in claim 1, in which the hydrocarbon oil is a mixture of aromatic petroleum naphtha and non-volatile hydrocarbon oil, non-volatile at the vulcanization temperature.

References Cited in the file of this patent

UNITED STATES PATENTS

| 2,483,797 | Van Valkenburgh | Oct. 4, 1949 |
| 2,555,257 | Van Valkenburgh | May 29, 1951 |